Patented Apr. 7, 1942

2,278,943

UNITED STATES PATENT OFFICE 2,278,943

PROCESS FOR THE PRODUCTION OF RUBBERLIKE BINDING AGENT FOR FIBER SUBSTANCES

Carl Ernst Willy Oesterreich, Berlin-Wilmersdorf, Germany

No Drawing. Application May 13, 1939, Serial No. 273,422. In Germany May 30, 1938

8 Claims. (Cl. 260—3)

The present invention relates to the production of a rubber-like binding agent capable of being precipitated upon fiber substances dispersed in water in an insoluble form which includes the rubber component.

As is known, it has not hitherto been possible to precipitate rubber adhesively onto fiber substances from solutions which contain rubber in dispersed form, that is principally in the form of latex, since in all such attempts coagulation of the rubber took place without formation of any considerable precipitate upon the fibers.

It has now been found that a binding agent for fiber substances which may be diluted in any proportion with water, which contains natural or artificial rubber and which may be precipitated upon fiber substances in an insoluble form which includes the rubber component can be produced in the following manner.

Precipitated animal or vegetable lecithin is introduced into boiling water and the mixture allowed to boil until the lecithin which has been introduced has completely distributed itself in the water in a finely dispersed condition. To this solution there is added an aqueous solution of phenol-aldehyde resol in alkali, whereupon solution of the dispersed lecithin takes place. Wood tar or wood tar oils is or are then added to this solution with continuous further boiling and good stirring and brought into solution. The solution is then allowed to cool and a mono- or disaccharide is added to the cooled solution. Finally the solution receives a further addition of a water-soluble salt of silicic acid. The mixed solution so produced is stirred without heating with the latex of a natural or synthetic rubber, the quantity of latex added depending upon the kind of fiber-substance end product to be produced. Advantageously 25-100 parts of latex are added, calculated upon 100 parts of the mixed solution produced as described above. Hereupon the binding agent according to the invention is ready. It contains the rubber components in a finely divided condition absolutely proof against putrefaction and decomposition, and is indefinitely stable as such.

The following example illustrates how the invention may be put into effect:

5 parts by weight of vegetable lecithin are dispersed in 50 parts by weight of boiling water and to this there is then added a solution of 100 parts by weight of phenol-aldehyde resol in 100 parts of dilute aqueous caustic soda. To this 50 parts of birch tar are further added, which likewise dissolve in the hot solution. Then 200 parts by weight of glucose and 400 parts by weight of sodium or potassium silicate or a mixture thereof are added to the cooled solution. To the mixed solution so obtained there is added an equal quantity by weight of natural or synthetic latex with good stirring. If the presence of filling substances is desired, the mixed solution may further be mixed prior to the addition of the latex with an admixture of 200 parts by weight of highly swellable clay (china clay and the like).

The rubber-containing binding agent thus produced is miscible with water in any proportion. It can be mixed in desired concentration with the aqueous dispersion of a fiber-substance and can be separated therefrom in flocks in manner known per se by addition of diluted solution of weak acids or acid-reacting salts. In this case however the separation in flocks surprisingly takes place in such a way that the binding agent is precipitated upon the fiber-substance in an insoluble form which includes the total content of rubber.

The fiber-substances loaded with this binding agent may be worked up in manner known per se into finished products of very good elastic properties.

Some of the above mentioned components of the binding agent are already known as additions to rubber latex. Thus for example it is known in the production of rubber cement, that is to say of an adhesive and coating agent built up upon the basis of rubber, to add pine wood tar or sodium silicate to the rubber latex in order to increase the adhesiveness of the rubber cement thereby. Further it is known to add glucose to the rubber latex employed as binding agent for animal skin fibers, in order to obtain a softer end product. Substances of the group of organic fatty esters, that is to say compounds related to lecithins, have also been employed as stabilisers for rubber latex. Moreover, basic phenol compounds (sodium phenolate) have been proposed for the same purpose as stabilisers for latex. Finally the use of clays in admixture with rubber latex is also already known for packing masses.

On the other hand, the process according to the invention is concerned with the production of a rubber-containing fiber substance binding agent which, because of the way in which it is produced with the addition in a definite sequence of additional substances already in part known per se, gives the technically entirely novel effect that upon precipitation of the binding agent a solid, water-insoluble binding which includes the rubber component is produced upon the fiber substance.

What I claim is:

1. A process for the production of a rubber-like binding agent for fiber-substances which comprises adding a solution of 100 parts by weight of phenol-aldehyde resol in 100 parts by weight of dilute aqueous caustic soda to a dispersion of 5 parts by weight of vegetable lecithin in 50 parts by weight of boiling water to form a hot solution, dissolving 50 parts by weight of birch tar in said hot solution, cooling said solution, adding 200 parts by weight of glucose and 400 parts by weight of an alkali metal silicate to said solution, and stirring said solution with an equal quantity by weight of rubber latex.

2. A process for the production of a rubber-like binding agent for fiber-substances which comprises adding a solution of 100 parts by weight of phenol-aldehyde resol in 100 parts by weight of dilute aqueous caustic soda to a dispersion of 5 parts by weight of vegetable lecithin in 50 parts by weight of boiling water to form a hot solution, dissolving 50 parts by weight of birch tar in said hot solution, cooling said solution, adding 200 parts by weight of glucose and 400 parts by weight of an alkali metal silicate to said solution, forming a mixture of 200 parts by weight of clay with said solution and stirring said mixture with an equal quantity by weight of rubber latex.

3. A process for precipitating a rubber-containing binding agent upon fiber substances in an insoluble form which includes the rubber component, said process comprising the following steps: adding an alkali solution of a phenol-aldehyde resol to a dispersion of lecithin in hot water to form a hot solution; dissolving a substance selected from the group consisting of wood tar and wood tar oils in said hot solution, and cooling said solution; adding a water-soluble silicate, and a substance selected from the group consisting of mono- and di-saccharides to said solution; mixing the solution thus obtained with rubber latex; mixing the resulting solution with a fiber substance and adding to it a diluted solution of a precipitating agent selected from the group consisting of weak acids and acid-reacting salts.

4. A process for precipitating a rubber-containing binding agent upon fiber substances in an insoluble form which includes the rubber component, said process comprising the following steps: adding an alkali solution of a phenol-aldehyde resol to a dispersion of lecithin in hot water to form a hot solution; dissolving a substance selected from the group consisting of wood tar and wood tar oils in said hot solution, and cooling said solution; adding a filling substance, and a water-soluble silicate, and a substance selected from the group consisting of mono- and di-saccharides, to said solution; mixing the solution thus obtained with rubber latex; mixing the resulting solution with a fiber substance, and adding to it a diluted solution of a precipitating agent selected from the group consisting of weak acids, and acid-reacting salts.

5. As a new product, an aqueous dispersion produced from and containing an aqueous alkali solution of a phenol-aldehyde resol; an aqueous dispersion of lecithin; a substance selected from the group consisting of wood tar and wood tar oils; a water-soluble silicate; a substance selected from the group consisting of mono- and di-saccharides; and rubber latex; said dispersion being miscible in all proportions with water, and being capable of precipitation upon a fiber substance in an insoluble form which includes the rubber component.

6. As a new product, an aqueous dispersion produced from and containing an aqueous alkali solution of a phenol-aldehyde resol; an aqueous dispersion of lecithin; a substance selected from the group consisting of wood tar and wood tar oils; a water-soluble silicate; a substance selected from the group consisting of mono- and di-saccharides; a filling substance and rubber latex; said dispersion being miscible in all proportions with water, and being capable of precipitation upon a fiber substance in an insoluble form which includes the rubber component.

7. A process for producing a rubber-containing binding agent which is miscible with water, and capable of being precipitated from an aqueous dispersion in an insoluble form which includes the rubber component, said process comprising dispersing lecithin in hot water to form a hot aqueous dispersion; adding to said dispersion an alkali solution of a phenol-aldehyde resol to form a hot solution; dissolving a substance selected from the group consisting of wood tar and wood tar oils in said hot solution; cooling said solution; adding a water-soluble silicate and a substance selected from the group consisting of mono- and di-saccharides to said solution, and mixing said solution with rubber latex.

8. A process for producing a rubber-containing binding agent which is miscible with water, and capable of being precipitated from an aqueous dispersion in an insoluble form which includes the rubber component, said process comprising dispersing lecithin in hot water to form a hot aqueous dispersion; adding to said dispersion an alkali solution of a phenol-aldehyde resol to form a hot solution; dissolving a substance selected from the group consisting of wood tar and wood tar oils in said hot solution; cooling said solution; adding a filling substance, a water-soluble silicate and a substance selected from the group consisting of mono- and di-saccharides to said solution, and mixing said solution with rubber latex.

CARL ERNST WILLY OESTERREICH.